(12) United States Patent
Sathish

(10) Patent No.: US 8,209,399 B2
(45) Date of Patent: Jun. 26, 2012

(54) MESH NETWORKS FOR ADVANCED SEARCH IN LIFEBLOGS

(75) Inventor: Sailesh Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 708 days.

(21) Appl. No.: 11/808,104

(22) Filed: Jun. 6, 2007

(65) Prior Publication Data

US 2008/0307072 A1 Dec. 11, 2008

(51) Int. Cl.
*G06F 15/16* (2006.01)
(52) U.S. Cl. ...................... 709/218; 709/223; 455/414.1
(58) Field of Classification Search .................. None
See application file for complete search history.

(56) References Cited

U.S. PATENT DOCUMENTS

| | | | | |
|---|---|---|---|---|
| 6,766,363 | B1 * | 7/2004 | Rothschild | 709/219 |
| 6,865,297 | B2 * | 3/2005 | Loui et al. | 382/224 |
| 7,197,531 | B2 * | 3/2007 | Anderson | 709/203 |
| 7,275,063 | B2 * | 9/2007 | Horn | 707/102 |
| 7,369,164 | B2 * | 5/2008 | Parulski et al. | 348/231.99 |
| 7,509,347 | B2 * | 3/2009 | Chambers | 707/104.1 |
| 7,554,576 | B2 * | 6/2009 | Erol et al. | 348/211.3 |
| 2004/0158455 | A1 | 8/2004 | Spivack et al. | |
| 2005/0198035 | A1 | 9/2005 | Sundararajan et al. | |
| 2006/0015590 | A1 * | 1/2006 | Patil et al. | 709/220 |
| 2007/0016570 | A1 | 1/2007 | Punaganti et al. | |
| 2008/0021921 | A1 * | 1/2008 | Horn | 707/102 |
| 2008/0133526 | A1 * | 6/2008 | Haitani et al. | 707/7 |
| 2008/0250067 | A1 * | 10/2008 | Svendsen | 707/104.1 |
| 2008/0288596 | A1 * | 11/2008 | Smith et al. | 709/206 |

OTHER PUBLICATIONS

Gargi Ullas, et al.; "Managing and Searching Personal Photo Collections"; Mar. 18, 2002; pp. 1-10.*
"Managing and Searching Personal Photo Collections" by Ullas Gargi et al., published in 2002; pp. 1-10.*
Sailesh, Sathish et al., "*Context Service Framework for the Mobile Internet*", Sep. 2006, pp. 17-24.
International Search Report PCT/IB2008/000884 dated Aug. 6, 2008.
Sarvas Risto, et al.; "MobShare: Controlled and Immediate Sharing of Mobile Images"; Oct. 10, 2004; pp. 724-731.
Panu Vartiainen; "Using Metadata and Context Information in Sharing Personal Content of Mobile Users"; Feb. 27, 2003; pp. 1-67.

* cited by examiner

*Primary Examiner* — Ian N Moore
*Assistant Examiner* — Dung B Huynh
(74) *Attorney, Agent, or Firm* — Mintz, Levin, Cohn, Ferris, Glovsky, and Popeo, P.C.

(57) ABSTRACT

A method including creating a node that is associated with an event recorded by a user, storing metadata associated with the node and linking the node with other nodes that are associated with the event, wherein the other nodes comprise at least one of local nodes and remote nodes. The method also includes sending metadata for the node to a corresponding remote node, searching at least one local device or remote device for nodes related to the event by using the metadata of nodes associated with the event and providing information to the user based on results obtained from searching of metadata associated with the local and remote nodes related to the event.

23 Claims, 4 Drawing Sheets

| Information related to the event |
|---|
| Links to ontology |
| Links to security policies |
| Links to owner information |
| Links to metadata of event data |
| ... |
| Links to address data structure |

Data Structure

Figure 4

MESH NETWORKS FOR ADVANCED SEARCH IN LIFEBLOGS

BACKGROUND OF THE INVENTION

1. Field of the Invention

The present invention relates to an apparatus and method of searching for data related to events beyond the capabilities of current search mechanisms, wherein particular scenarios are examined when a group of users jointly witness an event and devices associated with users of the group record information from the same event.

2. Description of the Related Art

Today, users carry mobile devices or other devices that are capable of capturing data associated with events in different modalities, at all times. Based on context data or user cues that act as triggers, the user's mobile device may record an event that can be unimodal. For example, the user's mobile device may record an event in a plain audio format or in a multimedia format, such as video, audio and/or still pictures. The mobile device stores the recording along with the context data that characterized the event. The context data could be, for example, the location, time, date of recording, and a corresponding calendar entry for the event. Environmental data may also be simultaneously recorded with the event data and the content data. For example, environmental data may include a stadium name and location where the event occurred. The context data and environment data form a part of the metadata for the event. Thus, if a group of people attended the same event, the mobile device for each person in the group would have a different recording of the same event. The recordings for the group could be connected to each other through their metadata, amongst other information.

Although many context aware systems have been developed, especially for mobile devices, where proximity to users allows for collecting more reliable context data, these systems suffer from a lack of interoperability, complexity and experience adaptation difficulties. There are currently no frameworks that are interoperable, that are able to handle the complexity associated with searching content and environmental data associated with an event, and that are easily adaptable. With advanced mobile capability, recording of every day events in multiple formats is a reality. It is, therefore, imperative to provide a highly adaptive and intuitive framework linking multiple events for searches.

SUMMARY OF THE INVENTION

An embodiment of the present invention is directed to a method including creating a node that is associated with an event recorded by a user, storing metadata associated with the node and linking the node with other nodes that are associated with the event, wherein the other nodes comprise at least one of local nodes and remote nodes. The method also includes sending metadata for the node to a corresponding remote node, searching at least one local device or remote device for nodes related to the event by using the metadata of nodes associated with the event and providing information to the user based on results obtained from searching of metadata associated with the local and remote nodes related to the event.

Another embodiment of the invention is directed to a device including a creating unit configured to create a node that is associated with an event recorded by a user and a storing unit configured to store metadata associated with the node. The device also includes a linking unit configured to link the node with other nodes that are associated with the event, wherein the other nodes comprise at least one of local nodes and remote nodes. The device further includes a sending unit configured to send metadata for the node to a corresponding remote node, a searching unit configured to search at least one local device or remote device for nodes related to the event by using the metadata of nodes associated with the event and a providing unit configured to provide information to the user based on results obtained from searching of metadata associated with the local and remote nodes related to the event.

Another embodiment of the invention is directed to an apparatus including creating means for creating a node that is associated with an event recorded by a user, storing means for storing metadata associated with the node and linking means for linking the node with other nodes that are associated with the event, wherein the other nodes comprise at least one of local nodes and remote nodes. The apparatus also includes sending means for sending metadata for the node to a corresponding remote node, searching means for searching at least one local device or remote device for nodes related to the event by using the metadata of nodes associated with the event and providing means for providing information to the user based on results obtained from searching of metadata associated with the local and remote nodes related to the event.

Another embodiment of the invention is directed to a computer program embodied on a computer readable medium. The computer program is configured to perform the method including creating a node that is associated with an event recorded by a user, storing metadata associated with the node and linking the node with other nodes that are associated with the event, wherein the other nodes comprise at least one of local nodes or remote nodes. The method also includes sending metadata for the node to a corresponding remote node, searching at least one local device or remote device for nodes related to the event by using the metadata of nodes associated with the event and providing information to the user based on results obtained from searching of metadata associated with the local and remote nodes related to the event.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 4 illustrates an embodiment of the data structure for each node.

DETAILED DESCRIPTION OF PREFERRED EMBODIMENTS

Reference will now be made to the preferred embodiments of the present invention, examples of which are illustrated in the accompanying drawings.

Users belonging to a common group, such as a community, a business, a company, and users attending the same event, may be connected to each other. Each of these users may express a preference for sharing content recorded by the user on an associated mobile device. The user preferences for sharing recorded content can be dynamically discovered either at the time of recording or during searching via a common service to which the user belongs. Typically, dynamic discovery at the time of recording is possible because users of a group belong to the same software framework that recorded the event data. Post processed event data, metadata and context data stored by the common service can be dynamically discovered via the common service to which users of a group belongs.

Events recorded by users may be interconnected. For example, a football match between team A and team B could have been made possible because team B won an earlier match against team C. Thus, the event between teams A and B would be interconnected to event between teams C and B. Similarly, an after work shopping event may be related to a business meeting that occurred at an earlier time, through a temporal relationship.

Figure 1:
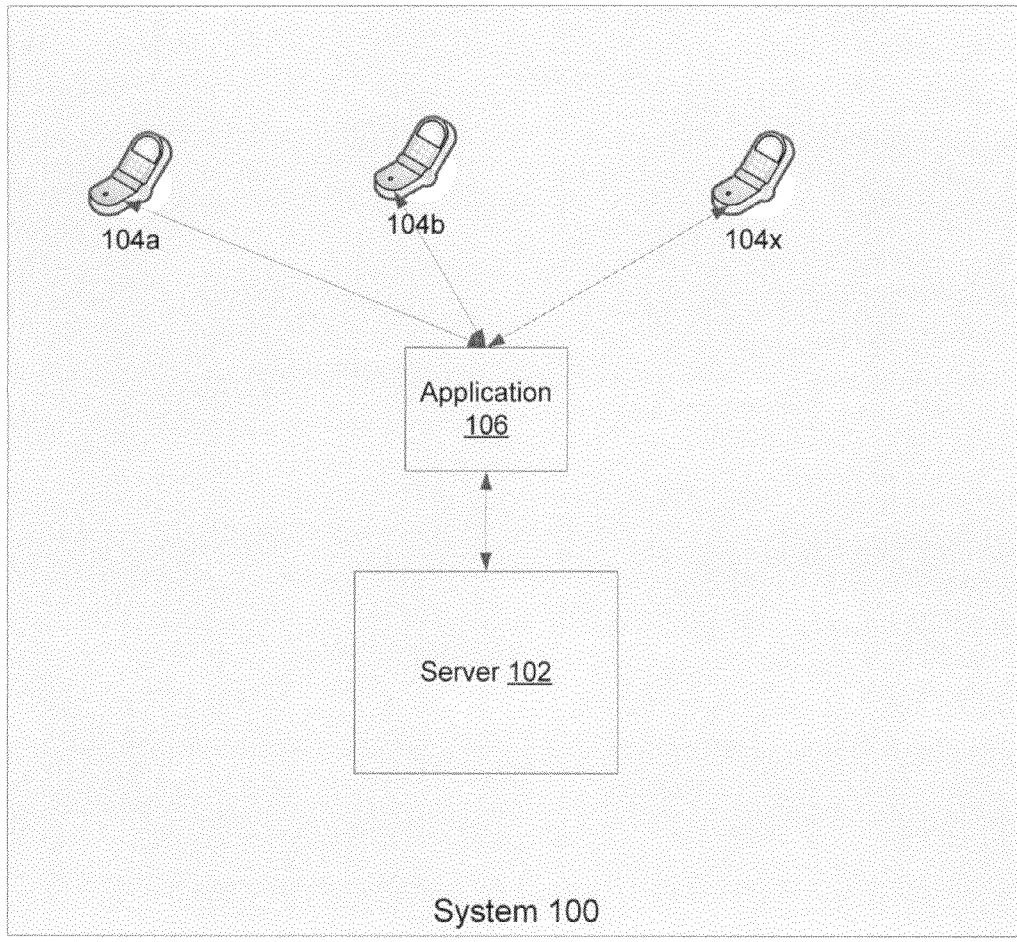
FIG. 1 illustrates a system architecture in which an embodiment of the invention may be implemented.

FIG. 1 illustrates a system architecture in which an embodiment of the invention may be implemented. System 100 includes a central server 102, multiple mobile devices 104a-104x, each of which belongs to a users implementing embodiments of the invention, and an application/program 106 that may be executed on each of the mobile devices. In an embodiment of the invention, each event would be registered with central server 102 where event information including location information can be registered. Thereafter, when users run program 106, program 106 may consult with the server 102 to obtain information about the user. By combining the information provided by program 106 with the information already stored with server 102, the server 102 can determine which users are attending an event. Alternatively, in another embodiment of the invention, dynamic on-the-fly links between users of the group can be established by server 102.

Figure 2:
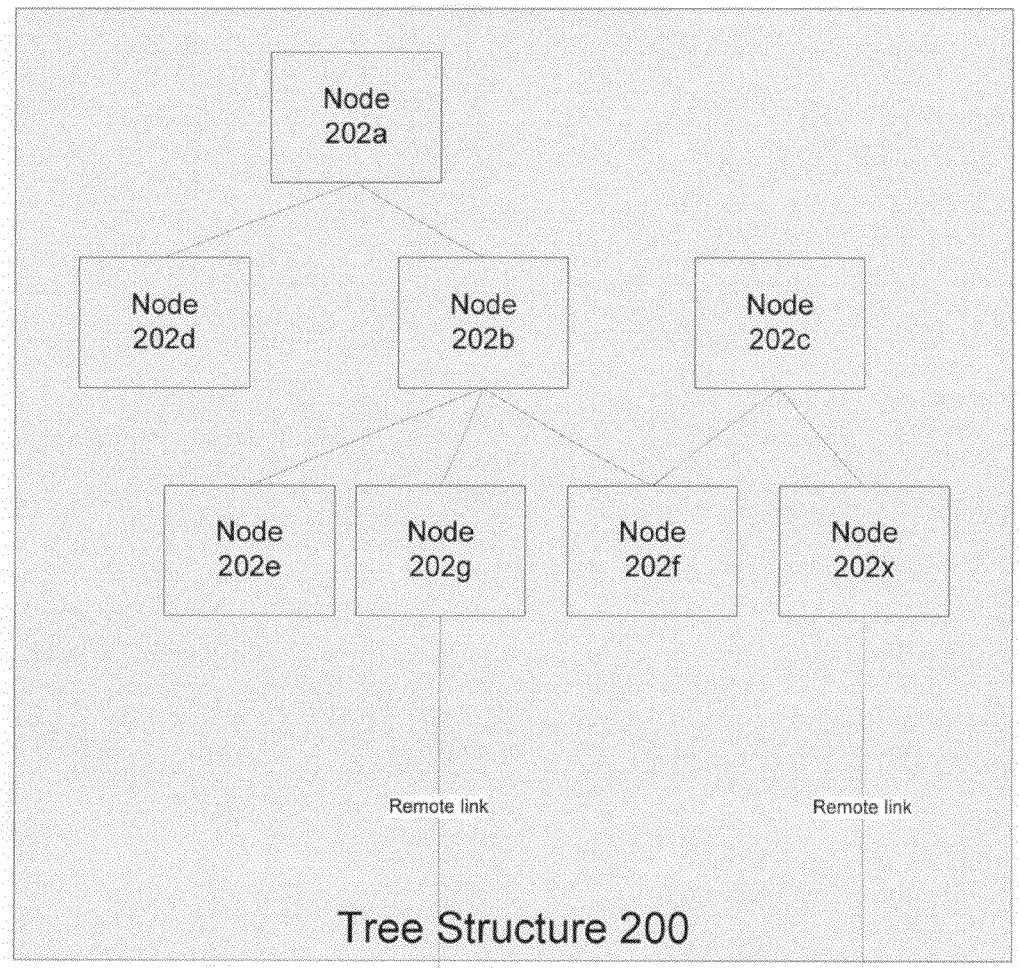
FIG. 2 illustrates a framework implementing an embodiment of the invention.

FIG. 2 illustrates a framework implementing an embodiment of the invention. The framework builds a tree structure 200 where each node 202a-202x in the tree depicts an event. Tree nodes 202 include, for example, metadata such as the time associated with an event, the name of the event, relation to other calendar events, a uniform resource locator (URI) for the event data, additional links to additional metadata and linked media devices of other users who attended the event. The URI for the event may be stored on a remote server. The position of a node, for example 202b within tree structure 200 shows the relationship of node 202 to other interconnected nodes 202a, 202f and 202g. In the example where the after work shopping event is related to an earlier business meeting, the shopping event will be represented as a child node, for example 202d of node 202a representing a business meeting because the shopping event is to happen after the business meeting. The node network 200 thus has parents, children and siblings. It should be noted the node network may extend exponentially and possibly infinitely.

The links connecting the nodes includes data sets. These links provide information, beyond structural information, about the relationship between nodes 202. The links provide information about the semantic relationships between the connected nodes. The links also provide information about the weights of the connected links. Tree structure 200 is a mesh network structure where all nodes 202 can be interconnected if there are semantic relations that can link two nodes together.

A user whose mobile device, for example mobile device 104, is capable of recording events may host a personal mesh network locally on mobile device 104 or in a distributed fashion on server 102. The local network, for example the tree network shown in FIG. 2, would have nodes, for example nodes 202g and 202x, that are interconnected to other nodes in other users' mobile devices because of an event relationship. These virtual connections are maintained as part of metadata of nodes 202g and 202x that is associated with the event. When there are virtual connections, each event node, such as 202g and 202x, would have associated metadata of IPV6 addresses and semantic link relationships to those nodes, including the address of the particular nodes in the remote tree, to which the event is connected. The address of the nodes in the remote tree to which the event is connected is negotiated as part of the networking protocol that happens during the recording. The address is generated by the framework and it corresponds to an associated entry within the mesh network. The address format can be simple as a unique identifier that is generated by the framework, wherein the identifier along with the IP or SIP URI address can be used to correctly identify the node. The identifier for node 202g or 202x associated with an event is sent as part of the metadata to a corresponding node in the remote user's network.

When the nodes are created in corresponding networks that are associated with different users, each node, for example node 202g or 202x, would have the identifier and URI of the linked node in the remote network associated with the other users. This acts as a cross checking feature that ensures that the remote node that is linked can be verified. The linked list of networks may form an interconnected network of infinite span as related nodes are created between user devices. The related nodes may further correspond to joint or linked events that are connected to other events and so on.

Thus, in an embodiment of the present invention, metadata for nodes representing event data can be local or remote. As noted above, node 202x on a local device can be linked to another node on a remote device. To properly link these interconnected nodes, two addresses are need, the first one for identifying the remote device and the second address for identifying the exact node on the remote device that is connected to node 202x on the local device. An embodiment of the present invention uses the IPv6 addresses of the devices because all devices can be identified through IPv6 addresses due to the vast available address space. IPv6 address may be used to extend the inventive framework beyond mobile devices. Alternatively, SIP URL or DNS addressing for the devices may also be used. It should be noted that a SIP URI or DNS that can be mapped to an IPV6.

Figure 3:
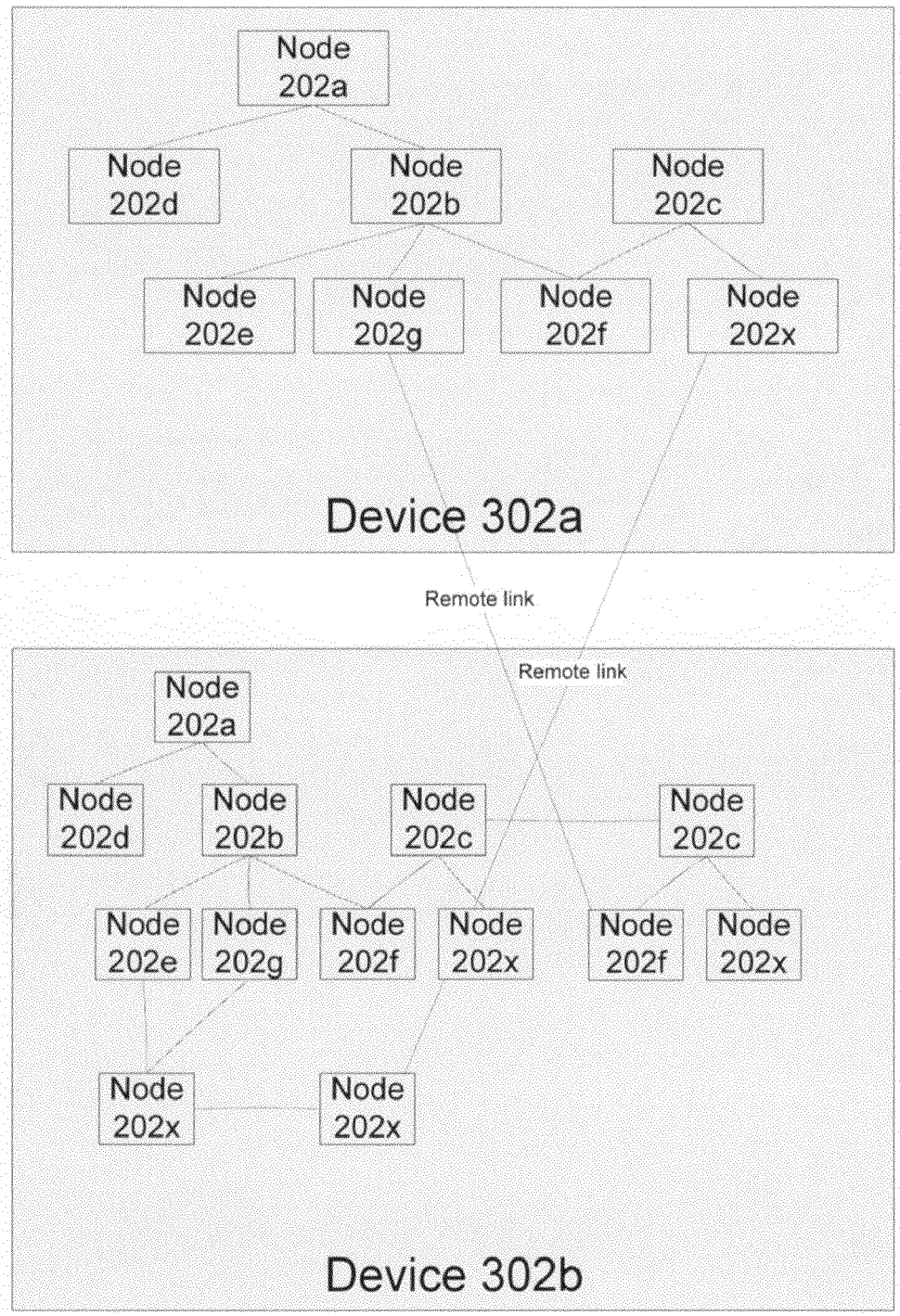
FIG. 3 illustrates an embodiment of the inventive node tree in which an embodiment of the present invention occurs.

FIG. 3 illustrates an embodiment of the inventive node tree in which an embodiment of the present invention occurs. FIG. 3 illustrates tree structures, as described in FIG. 2, on two devices 302a and 302b. Each node 202 in trees 200 represents a metadata related to an event. It is to be noted that the actual event data may be stored in another location. The event data that was captured by a local device, for example 303a, can be stored locally or in a distributed system.

FIG. 4 illustrates an embodiment of the data structure for each node. The metadata that is associated with the event will include information about related recordings of the same event that is stored locally and/or remotely. Thus, the metadata may include links to remote or local data. It is to be noted that the related nodes can be another local node that is associated with a historical event that is connected to the current event/node or another recording of the same event that is captured on a remote device. The metadata may also include information about links to other applications within the local mobile or links to external services such as reference to a calendar entry in the device.

In an embodiment of the invention, metadata of nodes 202 in the mesh network can include the following information. Nodes 202 may include the name of the event, the type of event, the location of the event, links to ontology that describes event concepts if applicable, the date and time of the event, link to security and privacy policies where applicable, the owner of the node, the type of event data recorded. The node may also include links to metadata of event data recorded, such as length of event data, owner of the event data, format of event data, resolution, and the device used for recording, a separate metadata extension so that the event data metadata is addressed separately and an address to the data that the node represents. The address will be a data structure in itself giving details, such as IPV6 address(es), if remote, SIP URI, if applicable, or a local address where the data can be found. The exact metadata representation format may be in any standardized representation.

Node 202 may also include a set of structures for each node to which the node is connected. Each structure may include the IPV6 address of the remote device that contains the next hop, the SIP URI of the next hop remote device, if applicable, and the node address of the remote node to which the links for next hop points. This can be any addressing format that is supported by the mesh network for example, an XPath expression can be used to identify the nodes. Each structure may also include the perceived/calculated strength of the link between the linked nodes. This can be a numerical metric, user supplied metric, if applicable, user supplied additional information such as preference values, for later searching and combination of data, other information through a standardized vocabulary that is machine readable and used when making a decision as to whether or not to include a node as a connected node. Each structure may also include the type of relationship this link represents, link to an ontology that explains the relationship, the type of algorithm used to compute the relationship, the type of event data to which the link points, the owner of the next hop node, links to security and privacy policy for the next hop if applicable, whether the connected node is remote or local and the immediate link address, which may be internal pointers understood by the search engine, that this node is associated with. The manner in which links are formed in the inventive system depends on security and privacy policies set up by users.

In an embodiment of the invention, each event, such as rock concert, would be registered with a central server 102 where event information including location information can be registered. Thereafter, when users run a program 106, program 106 may consult with the server 102 to obtain information about where the user is. That is, program 106 determines where the user is by comparing the user location information and other context data, such as an entry from the user calendar. By combining the information provided by program 106 with the information already stored with server 102, the server 102 can determine which users are attending an event. The users have the power to allow the service to share user data and event data with other users, wherein service 102 may add on other user "event objects" to the user event object. Thus, a link between the other users is created.

Alternatively, in another embodiment of the invention, dynamic on-the-fly link can be established. The dynamic links may be invoked in several ways. For example, a user always synchronizes the application whenever the program is invoked, thereby obtaining information from the registry service about SIP and/or IPv6 addresses of proximal users. In another example, the user, when attending an event, can query the service to synchronize with other devices running the same application and at same location, time and date. In another example, if the user knows the identity, SIP, URI, DNS name or IPv6 address of another user, the user may send an invite request asking for synchronization. Alternatively, in another example, the user can also request to join dynamically created groups, such as a group created for people attending a particular event. The group URI provided by the event organizer can be searched. In another embodiment, after recording an event and generating a metadata object for the event, the object may be registered with the service where the service can add-on more metadata and generate links for this object with other objects having similar metadata. In another example, a user device can send polling objects containing location, event data, date, time, SIP URI/IPv6 information and event name as beacons through a WLAN or Bluetooth, thereby restricting location span and invoking response objects from other devices providing match to these metadata. That is, if two or three important fields such as location, time and date are similar, then they respond. As such location information, time and date forms one major metadata of the object. The present invention, thus, covers session establishment through a service domain as in lifeblog application dealing with event data and object structure and fields, as noted above.

The present invention is also directed to the use of a search API where a span of objects from a center object can be mentioned. The search API may support the maximum number of nodes to span, that is to include in a search, the direction of span, if applicable, the type of span to be employed, that is a circular span, a parabolic span or any mathematical shape satisfied through algebraic expressions, user supplied script code that can determine whether a node can be accepted or not wherein a boolean value may be returned to indicate whether the node can be included in search, data in some representation form about the event to be searched and the media types that are of interest. The direction of the span may be along any 3D axis and the direction can be specified in one dimension with a degree span from 0-360. Default values may be supplied for all the above parameters. The invention is also directed to an output generation mechanism where different media can be combined to provide output to user. The output request can happen through an API where the user specifies the type of event data, the level of overlap allowed, the type of presentation such as combined media or unimodal output, link to a schema that determines how the data is presented, multimodal combination rules (integration rules), if needed.

A search application may search for an event that occurred a while ago when the event has a corresponding media entry or recording. The search application identifies the correct node of that event in a local mesh network by understanding the semantics of the search query. The search application may use any standard query solution to understand the semantics of the search query. Based on the metadata on the node, the correct node may be identified. The node would have entry that is associated with user's recording of that event. The entry may include the URI of the recording and other information associated with the event. The node may also have entries of related recordings performed by other users of the group who attended the same event. Based on criteria provided by the search application, the framework would select a set of linked nodes that may used to construct a multimedia output for the user. The search criteria may include the types of events desired, the span of the network that should be searched, since the network search can expand exponentially and multiple views of the same media type, for example different videos stitched together, among other information.

Based on such criterion, the metadata of nodes is searched building a virtual linked node set that correspond to the search criterion. This node set is then passed on to an output generator that builds a multimedia output taking events corresponding to each node set and building a composite node set. The span parameter supplied during search can supply such information as the number of nodes to be included, particular media types or strength of link between the nodes, that is, as the nodes span away the strength of the link also fades. The span can also include direction of the search that would be applicable for certain applications.

It should be appreciated by one skilled in art, that the present invention may be utilized in any device that implements the event searching algorithm described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

The invention claimed is:

1. A method comprising:
   creating, by a mobile wireless device, a first node that is associated with a first event recorded by a user,
      wherein the first node is included in a structure representing relationships among a plurality of nodes, each of the plurality of nodes includes metadata representative of an event, the structure including one or more links connecting the plurality of nodes, the one or more links each include a data set providing information representative of the relationships among the plurality of nodes including whether at least one of the plurality of nodes is a local node to the mobile wireless device or a remote node to the mobile wireless device, the metadata and the one or more links enable the mobile wireless device to perform a semantic search of the plurality of nodes based on the relationships of the plurality of nodes, and wherein the metadata at each of the plurality of nodes includes an internet protocol address and a session initiation protocol uniform resource identifier to identify each of the plurality of nodes and to check remote locations;
   storing the metadata associated with the first node;
   linking, based on at least one of the one or more links, the first node with at least one of the plurality of nodes that are associated with the first event, wherein the at least one of the plurality of nodes comprises at least one of the local node stored on the mobile wireless device and the remote node stored on another device;
   sending the metadata for the first node from the mobile wireless local device to the remote node on the another device, the another device external to the mobile wireless device;
   searching at least one of the mobile wireless device and the another device for nodes related to the first event by using the metadata of the plurality of nodes associated with the first event; and
   presenting information at the mobile wireless device based on results obtained from searching the metadata associated with the local and remote nodes related to the first event.

2. The method of claim 1, wherein storing metadata comprises storing information associated with the event and storing links to at least one of an application or other information associated with the event.

3. The method of claim 1, wherein linking the node comprises creating a dataset that includes structural and relationship information of connected nodes and information associated with connected links.

4. The method of claim 1, further comprising creating a network of nodes that is associated with the user, wherein the network is stored locally or remotely.

5. The method of claim 1, wherein storing metadata comprises storing in the metadata address information and link relationships to remote nodes that are link to the node.

6. The method of claim 1, wherein linking the node comprises identifying an address for the remote device and an address for the remote node on the remote device to which the node is to be linked.

7. The method of claim 1, wherein linking the node comprises creating a dynamic link to local or remote nodes.

8. The method of claim 1, wherein searching comprises using the node as a central object and specifying at least one search criterion.

9. The method of claim 1, wherein the presenting comprises combining different media to provide an output to the user.

10. The method of claim 1, further comprising:
    registering an event with a server; and
    executing a program in communication with the server to obtain information associated with the user, wherein the user enables the server to share event data with other users of a group.

11. The method of claim 10, wherein executing the program comprises comparing information in the program with information in the server to determine information associated with the user.

12. An apparatus comprising:
    a creating unit configured on the apparatus comprising a mobile wireless device to create a first node that is associated with a first event recorded by a user,
       wherein the first node is included in a structure representing relationships among a plurality of nodes, each of the plurality of nodes includes metadata representative of an event, the structure including one or more links connecting the plurality of nodes, the one or more links each include a data set providing information representative of the relationships among the plurality of nodes including whether at least one of the plurality of nodes is a local node to the mobile wireless device or a remote node to the mobile wireless device, the metadata and the one or more links enable the mobile wireless device to perform a semantic search of the plurality of nodes based on the relationships of the plurality of nodes, and wherein the metadata at each of the plurality of nodes includes an internet protocol address and a session initiation protocol uniform resource identifier to identify each of the plurality of nodes and to check remote locations;
    a storing unit configured to store the metadata associated with the first node;
    a linking unit configured to link, based on at least one of the one or more links,
    the first node with at least one of the plurality of nodes that are associated with the first event, wherein the at least one of the plurality of nodes comprises at least one of the local node stored on the mobile wireless device and the remote node stored on another device;
    a sending unit configured to send metadata for the first node from the mobile wireless device to the remote node on the another device, the another device external to the mobile wireless device;
    a searching unit configured to search at least one of the mobile wireless device and the another device for nodes related to the first event by using the metadata of the plurality of nodes associated with the first event; and a presenting unit configured to present information at the mobile wireless device based on results obtained from searching the metadata associated with the local and remote nodes related to the event.

13. The apparatus of claim 12, wherein the storing unit is configured to store information associated with the event and store links to at least one of an application or other information associated with the event, wherein the links point to remote or local data.

14. The apparatus of claim 12, wherein the linking unit is configured to create a dataset that includes structural and relationship information of connected nodes and information associated with connected links.

15. The apparatus of claim 12, further comprising a creating unit configured to create a network of nodes that is associated with the user, wherein the network is stored locally or remotely.

16. The apparatus of claim 12, wherein the storing unit is configured to store, in the metadata, address information and link relationships to remote nodes that are link to the node.

17. The apparatus of claim 12, wherein the linking unit is configured to identify an address for the remote device and an address for the remote node on the remote device to which the node is to be linked.

18. The apparatus of claim 12, wherein the linking unit is configured to create a dynamic link to local or remote nodes.

19. The apparatus of claim 12, wherein the searching unit is configured to use the node as a central object and specifying at least one search criterion.

20. The apparatus of claim 12, wherein the presenting unit is configured to combine different media to provide an output to the user.

21. The apparatus of claim 12, further comprising:
a registering unit configured to register an event with a server; and
an executing unit configured to execute a program in communication with the server to obtain information associated with the user, wherein the user enables the server to share event data with other users of a group.

22. The apparatus of claim 13, wherein the executing unit is configured to compare information in the program with information in the server to determine information associated with the user.

23. A computer program embodied on a non-transitory computer readable storage medium, the computer program being configured to perform at least the following:
creating, by a mobile wireless device, a first node that is associated with a first event recorded by a user,
wherein the first node is included in a structure representing relationships among a plurality of nodes, each of the plurality of nodes includes metadata representative of an event, the structure including one or more links connecting the plurality of nodes, the one or more links each include a data set providing information representative of the relationships among the plurality of nodes including whether at least one of the plurality of nodes is a local node to the mobile wireless device or a remote node to the mobile wireless device, the metadata and the one or more links enable the mobile wireless device to perform a semantic search of the plurality of nodes based on the relationships of the plurality of nodes, and wherein the metadata at each of the plurality of nodes includes an internet protocol address and a session initiation protocol uniform resource identifier to identify each of the plurality of nodes and to check remote locations;
storing the metadata associated with the first node;
linking, based on at least one of the one or more links, the first node with at least one of the plurality of nodes that are associated with the first event, wherein the at least one of the plurality of nodes comprises at least one of the local node stored on the mobile wireless device and the remote node stored on another device;
sending the metadata for the first node from the mobile wireless local device to the remote node on the another device, the another device external to the local device;
searching at least one of the mobile wireless device and the another device for nodes related to the first event by using the metadata of the plurality of nodes associated with the first event; and
presenting information at the mobile wireless device based on results obtained from searching the metadata associated with the local and remote nodes related to the first event.

* * * * *